May 28, 1929.   J. R. HUGHES   1,714,786
STEERING POST COLUMN
Filed Feb. 27, 1928

INVENTOR.
James R. Hughes
BY P. M. Pomeroy
ATTORNEY

Patented May 28, 1929.

1,714,786

UNITED STATES PATENT OFFICE.

JAMES R. HUGHES, OF SOUTH BEND, INDIANA, ASSIGNOR TO THE STUDEBAKER CORPORATION, OF SOUTH BEND, INDIANA, A CORPORATION OF NEW JERSEY.

STEERING-POST COLUMN.

Application filed February 27, 1928. Serial No. 257,307.

This invention relates to vehicle steering columns and more particularly to means for covering the space between the steering column and the walls of the opening in the floor boards through which the steering column extends.

In conventional constructions the steering column extends through a floor board opening which is usually somewhat larger in diameter than the steering column to allow the floor boards to be easily removed and to allow the inclined position of the steering column to be adjusted. The enlarged toe board opening allows considerable space around the steering column through which dirt, dust and exhaust gases from the engine compartment may enter the driver's compartment of the vehicle. Heretofore, metal plates or stampings surrounding the steering column have been used to cover the space surrounding the same. These plates are secured to the floor board by a plurality of screws which have to be removed every time it is desired to remove the floor boards or to adjust the inclined position of the steering column. Hence, it is the principal object of the present invention to provide a new and novel means for covering the space between the steering column and the opening in the floor boards through which the column extends, which means is simple in construction, easy to manufacture and economical to manufacture.

Another object is to provide a vehicle steering column with means for covering the space in the floor boards surrounding the same which means is not secured to the floor boards but is held against inadvertent displacement by its gripping action on the steering column.

A further object is to provide a steering column with a rubber collar surrounding the same which covers the space between the column and floor board opening through which the steering column extends, the rubber collar being held against inadvertent displacement by its gripping action on the walls of the steering column.

These being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a section through the floor boards and dash of a motor vehicle showing the collar for closing the steering column opening in the floor boards.

Figure 1:
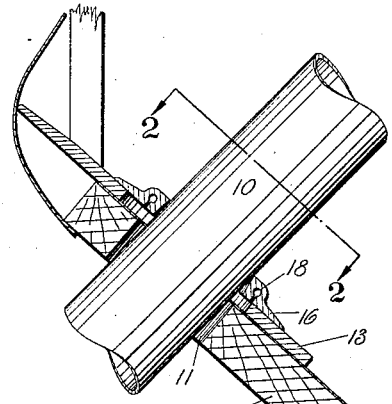
Figure 2:
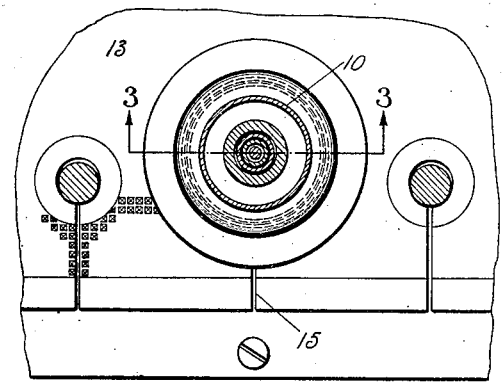
Figure 2 is an enlarged section taken on the line 2—2 of Figure 1 looking toward a steering post collar.

Referring to the accompanying drawing in which like numerals refer to like parts throughout the several views, the vehicle steering column 10 extends through an opening 11 in the vehicle floor boards 12 of the driver's compartment. Adjacent to the steering column 10 and covering the floor boards 12 or a portion of the same, is a mat 13 of rubber or any other suitable material. This mat 13 likewise has an opening 14 through which the steering column 10 extends and is slotted at 15 to allow the same to be removed from around the steering column 10. The openings 11 and 14 in the toe board 12 and mat 13 respectively, are larger in diameter than the steering column 10 to permit adjustment of the same and to allow easy removal of the floor boards 12. Dust, dirt, exhaust gases and the like from the engine compartment enter the driver's compartment through the openings 11 and 14 and cause great discomfort to the driver and occupants of the motor vehicle, therefore it has been found very necessary to cover the space between the steering column 10 and the walls of the openings 11 and 14. This has been accomplished by using the circular collar 16 of the present invention.

Figure 3:
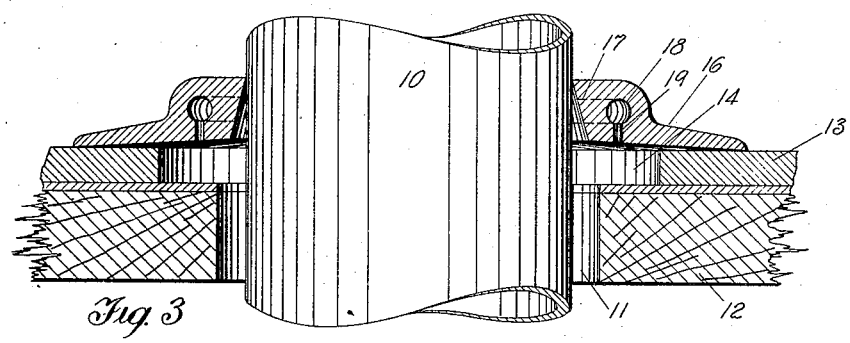
Figure 3 is a section taken on the line 3—3 of Figure 2 showing the collar before it is placed in final assembled position.
Figure 4:
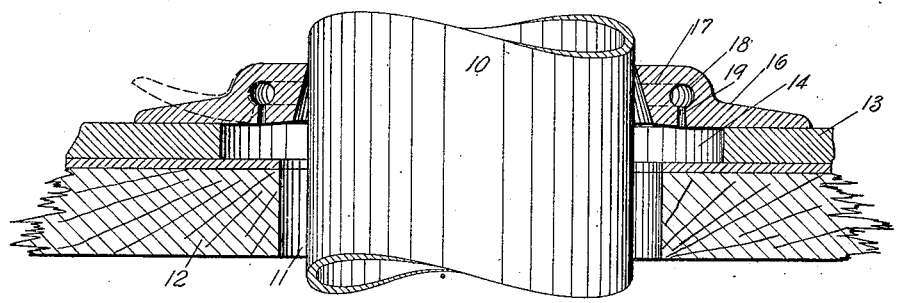
Figure 4 is a section similar to Figure 3 showing the collar after it has been placed in final assembled position.

As shown in Figures 3 and 4, the collar 16 is made of flexible rubber and moulded in the shape of an annular ring. The walls 17 of the central opening of the collar 16 are divergent as shown, the smaller diameter of this opening being approximately the same as that of the steering column 10. A circular opening 18 extends circumferentially around the collar 16 within the annulus thereof and the rubber between the opening 18 and the base of the collar 16 is recessed to provide a circumferential passageway 19 extending from the base of the collar to the opening 18 therein. The base of the collar 16 is dished as shown in Figure 3 which is for a purpose that will be presently described.

The collar 16 formed after the manner just described, is slipped over the steering column 10 to the position shown in Figure 3. The collar 16 is then pressed downwardly until the entire surface of the dished base thereof engages the mat 13 as shown in Figure 4. This distorts the collar 16 and causes the rubber comprising the smaller diameter of the central opening to more firmly grip the walls of the steering column 10 because of the fact that the smaller diameter is substantially the same as that of the steering column and because of the narrow surface thereof contacting with the steering column. There is a tendency for the distorted collar 16 to push upwardly and this also causes the smaller circumference of the collar to more firmly grip the walls of the steering column 10. Inadvertent displacement of the collar 16 is therefore prevented which is evident in Figure 4, which in broken outline shows one side of the collar lifted up or displaced. The rubber between the opening 18 and the upper surface of the collar merely flexes as shown and does not release the grip of the smaller circumference of the central opening with the walls of the steering column 10. The steering column 10 can be adjusted without touching the collar 16, but when it is desired to remove the floor boards 12, the collar 16 can be moved on the steering column 10 by gripping the same with both hands and pulling upwardly with considerable force. Gripping the collar 16 at one point only and pulling upwardly will not move the same as it will assume the position shown in the broken outline in Figure 4 without breaking the grip on the steering column 10.

It is evident that the present invention eliminates the necessity of providing split metal plates to cover up the steering column opening in floor boards and eliminates the need of screws and the like to hold the same in place. It is also evident that the construction shown and described is simple, economical to manufacture and very easy to assemble. It is to be understood however, that formal changes may be made in the specific embodiment of the invention described without departing from the spirit and substance of the broad invention, the scope of which is commensurate with the appended claims.

What I claim is:

1. In a motor vehicle, the combination with floor boards having an opening therein, and a steering column of lesser diameter than said opening extending therethrough, of a flexible collar surrounding said steering column to cover the space between said column and the walls of said opening, said collar having a dished base to permit the upper edge of the wall surrounding the opening therein to frictionally engage said column to avoid inadvertent displacement thereof.

2. In a motor vehicle, the combination with floor boards having an opening therein, and a steering column of lesser diameter than said opening extending therethrough of a flexible collar engaging the sides of said steering column to cover the space between said column and the walls of said opening, said collar being provided with an opening therein coaxial with the central opening thereof and a circumferential passageway extending from the base of said collar to said co-axial opening to permit flexing of the collar for causing the same to grip said steering column.

3. In a motor vehicle, the combination with floor boards having an opening therein, and a steering column of lesser diameter than said opening extending therethrough, of means covering the space between said steering column and the walls of said opening comprising a flexible annular ring having an opening co-axial with the central opening thereof, said ring having a dished base and a circumferential passageway extending from said co-axial opening to said base to permit flexing of said ring to grip said steering column.

4. In a motor vehicle, the combination with floor boards having an opening therein, and a steering column of lesser diameter than said opening extending therethrough, of means covering the space between said steering column and the walls of said opening comprising a flexible annular ring, the central opening of said ring being formed with divergent side walls and the annulus of said ring being provided with an opening therein co-axial with the central opening, said ring having a dished base and a circumferential passageway extending from said co-axial opening to said base to permit flexing of said ring to cause the smaller circumference of said central opening to grip said steering column.

Signed by me at South Bend, Indiana, this 24th day of February, 1928.

JAMES R. HUGHES.